United States Patent
Gorin et al.

(10) Patent No.: US 7,590,224 B1
(45) Date of Patent: Sep. 15, 2009

(54) AUTOMATED TASK CLASSIFICATION SYSTEM

(75) Inventors: Allen Louis Gorin, Berkeley Heights, NJ (US); Barry Allen Parker, Stewartsville, NJ (US); James B. Scherer, Bloomsbury, NJ (US); Jay Gordon Wilpon, Warren, NJ (US)

(73) Assignee: AT&T Intellectual Property, II, L.P., New York, NY (US)

( * ) Notice: Subject to any disclaimer, the term of this patent is extended or adjusted under 35 U.S.C. 154(b) by 140 days.

(21) Appl. No.: 09/699,495

(22) Filed: Oct. 31, 2000

Related U.S. Application Data

(63) Continuation-in-part of application No. 08/943,944, filed on Oct. 3, 1997, now Pat. No. 6,192,110, which is a continuation-in-part of application No. 08/528,578, filed on Sep. 15, 1995, now Pat. No. 5,675,707.

(51) Int. Cl.
- H04M 11/00 (2006.01)
- H04M 1/64 (2006.01)
- G10L 15/00 (2006.01)
- G10L 21/00 (2006.01)

(52) U.S. Cl. ............... 379/88.13; 379/88.04; 704/275; 704/231

(58) Field of Classification Search ............ 704/246, 704/251, 270, 270.1; 379/88.01
See application file for complete search history.

(56) References Cited

U.S. PATENT DOCUMENTS

| | | | |
|---|---|---|---|
| 4,777,600 A | 10/1988 | Saito et al. | 364/419 |
| 4,866,778 A | 9/1989 | Baker | 395/2.52 |
| 5,029,214 A | 7/1991 | Hollander | 395/2.81 |
| 5,033,088 A | 7/1991 | Shipman | 395/2.52 |
| 5,384,892 A * | 1/1995 | Strong | 704/243 |
| 5,390,279 A | 2/1995 | Strong | 395/2 |
| 5,434,906 A | 7/1995 | Robinson et al. | 379/67 |
| 5,509,060 A * | 4/1996 | Hall et al. | 379/207.02 |
| 5,577,165 A * | 11/1996 | Takebayashi et al. | 704/275 |
| 5,666,400 A | 9/1997 | McAllister et al. | 379/67 |
| 5,675,707 A * | 10/1997 | Gorin et al. | 704/257 |
| 5,719,921 A | 2/1998 | Vysotsky et al. | 379/88 |
| 5,790,754 A * | 8/1998 | Mozer et al. | 704/232 |
| 5,794,193 A * | 8/1998 | Gorin | 704/250 |
| 5,860,063 A * | 1/1999 | Gorin et al. | 704/257 |
| 5,905,774 A | 5/1999 | Tatchell et al. | 379/88.04 |
| 6,088,428 A * | 7/2000 | Trandal et al. | 379/88.02 |
| 6,269,153 B1 * | 7/2001 | Carpenter et al. | 379/88.02 |
| 6,487,277 B2 * | 11/2002 | Beyda et al. | 379/88.01 |

(Continued)

OTHER PUBLICATIONS

Blattner, Meera; Dannenberg Roger. "Multimedia Interface Design", ACM Press, New York, New York, QA 76.76.H92M84 199.*

(Continued)

Primary Examiner—Curtis Kuntz
Assistant Examiner—Joseph T Phan

(57) ABSTRACT

The invention concerns an automated task classification system that operates on a task objective of a user. The system may include a meaningful phrase generator that generates a plurality of meaningful phrases from a set of verbal and non-verbal speech. Each of the meaningful phrases may be generated based on one of a predetermined set of the task objectives. A recognizer may recognize at least one of the generated meaningful phrases in an input communication of the user and a task classifier may make a classification decision in response to the recognized meaningful phrases relating to one of the set of predetermined task objectives.

40 Claims, 5 Drawing Sheets

U.S. PATENT DOCUMENTS

| | | | | |
|---|---|---|---|---|
| 6,539,080 | B1* | 3/2003 | Bruce et al. | 379/88.17 |
| 6,601,031 | B1* | 7/2003 | O'Brien | 704/270.1 |
| 6,731,724 | B2* | 5/2004 | Wesemann et al. | 379/88.16 |
| 7,277,854 | B2* | 10/2007 | Bennett et al. | 704/257 |
| 7,398,209 | B2* | 7/2008 | Kennewick et al. | 704/255 |
| 7,398,211 | B2* | 7/2008 | Wang | 704/257 |
| 7,440,893 | B1* | 10/2008 | Gorin et al. | 704/240 |

OTHER PUBLICATIONS

Gorin et al, "Automated Call Routing" in a Telecommunications Network, $2^{nd}$ IEEE workshop on Interactive Voice Technology f Telecommunications Applications, Kyoto Research Park, Kyoto, Japan, Sep. 26-27, 1994.*

Gorin, Allen; On Automated language acquisition, Jun. 1995, J.Acoustical Society of America, 1997, 3441-3450.*

Gorin et al., ("Automated Call Routing in a Telecommunication Network", $2^{nd}$ IEEE Workshop on Interactive Voice Technology for Telecommunication Application, Kyoto Research Park, Kyoto, Japan, Sep. 26-27, 1994, pp. 137-140). Sep. 1994.

Gorin et al., ("An Experiment in Spoken Language Acquisition", IEEE Transactions on Speech and Audio Processing, vol. 2, No. 1, Part II, Jan. 1994, pp. 224-240). Jan. 1994.

Gorin et al., ("On Adaptive Acquisition of Spoken Language", Neural Networks for Signal Processing, Aug. 1991, pp. 422-431). Aug. 1991.

Miller et al., ("A Structured Network Architecture Language Acquisition", ICASSP'92: Acoustics, Speech & Signal Processing Conference, vol. 1, 1992, pp. 201-204). Sep. 1992.

Cole et al., ("The Challenge of Spoken Language Systems: Research Directions for the Nineties", IEEE Transactions on Speech and audio Processing, Jan. 1995, vol. 3, Issue 1, pp. 1-21). Jan. 1995.

Abella A., et al., "Generating Semantically Consistent Inputs to a Dialog Manager", $5^{th}$ European Conference on Speech Communication and Technology, Eurospeech '97, Sep. 1997.

Riccardi G., et al., 'A Spoken Language System for Automated Call Routing', International Conference on Acoustics, Speech, and Signal Processing, ICASSP-97, 1997.

Gorin et al., "How May I Help You", AT&T Research, Murray Hill, New Jersey, to appear in the Proc. of IVTTA, Philadelphia, Oct. 1996.

Allen L. Gorin, "Processing of Semantic Information in Fluently Spoken Language", AT&T Research, Murray Hill, New Jersey, to appear in the Proceedings of the ICSLP, Oct. 1996.

Gorin et al., "Spoken Language Acquisition for Automated Call Routing in a Telephone Network", Proceedings 1993 IEEE Workshop on Automatic Speech Recognition, Dec. 12-15, 1993.

Allen L. Gorin, "Spoken Dialog as a Feedback Control System", ESCA Workshop on Spoken Dialogue Systems, Vigso, Denamark, May 30-Jun. 2, 1995.

Gorin et al., "Spoken Language Acquisition for Automated Call Routing", ICSLP 94, Sep. 18-22, 1994.

Allen Gorin, "On Automated Language Acquisition", J. Acoust. Soc. Am. 97 (6), Jun. 1995, pp. 3441-3461.

* cited by examiner

FIG. 1

| ERRORS IN DETECTING BILLING CREDIT QUERIES |
|---|
| False Detections<br>yes i need a sprint operator I_NEED_CREDIT_EOS<br>yes i have a number here and i don't know if it's A_WRONG_NUMBER ...<br>i was trying to get 612 xxx xxxx and it said it WAS_DISCONNECTED... |
| Missed Detections<br>i am trying to call wooster and the number i have<br>  rings to a different number<br>i'm going to blame this one on my wife i misread her handwriting<br>i'm-dialing 215 xxx xxxx and i keep getting bells and things like that<br>i'm calling a long distance number in the 201 area code<br>    it just went booo boooo booo |

FIG. 2

| CORRECT DETECTIONS OF BILLING CREDIT QUERIES |
|---|
| i placed a call and i GOT_A_WRONG_NUMBER earlier this afternoon<br>yes i MISDIALED a number<br>I_WAS_CUT_OFF when trying to call this number<br>I_WAS_DIALING 1 xxx xxx xxxx and i got someone else<br>yes operator I_JUST_DIALED AN_INCORRECT_NUMBER<br>yes i would like TO_GET_CREDIT_FOR a number i called |

FIG. 3

| Classification Rate P(CREDIT \| phrase) | Coverage P(phrase \| CREDIT) | Phrase |
|---|---|---|
| \multicolumn{3}{c}{DETECTING BILLING CREDIT REQUESTS VIA SALIENT PHRASES} | | |
| 0.92 | 0.48 | wrong |
| 0.98 | 0.41 | wrong number |
| 0.95 | 0.45 | wrong (number\|eos\|call) |
| 0.97 | 0.42 | (a\|the\|was) wrong (number\|eos\|call) |
| 0.95 | 0.50 | F(wrong) \| F(dialed) |
| 0.95 | 0.57 | F(wrong) \| F(dialed) \| F(credit) |
| 0.95 | 0.59 | previous \| F(disconnected) |
| 0.95 | 0.64 | previous \| F(misdialed) \| F(cut off) |

*FIG. 6*

| Mut Inf | Phrase Fragments | Max Prob | Action |
|---|---|---|---|
| 7.4 | MADE A LONG DISTANCE | 0.93 | credit |
| 7.3 | LONG DISTANCE | 0.55 | (credit) |
| 7.1 | I WOULD LIKE | 0.24 | |
| 6.9 | AREA CODE | 0.65 | (area code) |
| 6.3 | COULD YOU TELL ME | 0.37 | |
| 5.6 | THE AREA CODE FOR | 0.92 | area code |
| 5.3 | I'M TRYING | 0.33 | |
| 5.0 | A WRONG NUMBER | 0.98 | credit |
| 4.9 | A LONG DISTANCE CALL | 0.62 | (credit) |
| 4.8 | THE WRONG NUMBER | 0.98 | credit |
| 4.8 | A NUMBER IN | 0.29 | |
| 4.4 | I'M TRYING TO | 0.33 | |
| 4.3 | LONG DISTANCE CALL | 0.62 | (credit) |
| 4.3 | TRYING TO | 0.30 | |
| 4.3 | I JUST MADE A | 0.93 | credit |
| 4.1 | I'D LIKE TO | 0.18 | |
| 4.0 | TO MAKE A CALL | 0.24 | |

AUTOMATED TASK CLASSIFICATION SYSTEM

CROSS REFERENCE TO RELATED APPLICATION

This application is a continuation-in-part of U.S. patent application Ser. No. 08/943,944 filed Oct. 3, 1997, now U.S. Pat. No. 6,192,110, which is a continuation-in-part of U.S. patent application Ser. No. 08/528,578 filed Aug. 15, 1995, now U.S. Pat. No. 5,675,707. U.S. Pat. No. 6,192,110 and U.S. Pat. No. 5,675,707 are hereby incorporated herein by reference in their entireties.

TECHNICAL FIELD

This invention relates to verbal and non-verbal speech processing, and more particularly to an automated task classification system related to the performance of one or more desired tasks.

BACKGROUND OF THE INVENTION

In telephonic communications it is well known for the recipient of a call, particularly in a commercial setting, to utilize an automated call routing system which initially presents the calling party with a menu of routing choices from which the caller is asked to select by pressing particular numbers on the keypad associated with the caller's telephone—the routing system recognizing a tone associated with the key pressed by the caller. It is also known to offer such callers a choice between pressing a number on the keypad to select a menu choice or to say that number—e.g., "press or say one for customer service". In the particular context of telephone services, it is also known to use an automatic routing system for selecting among billing options for a call placed over such a service. For example, in the case of a long distance telephone call to be billed to other than the originating number, a menu may be presented to the calling party in the form, "please say 'collect', 'calling card', 'third number' or 'operator'".

While such routing systems work reasonably well in cases where the number of routing choices is small, if the number of selections exceeds about 4 or 5, multi-tiered menus generally become necessary. Such multi-tiered menus are very unpopular with callers—from the perspective of a typical caller, the time and effort required to navigate through several menu layers to reach a desired objective can seem interminable. Equally important, from the perspective of both the caller and the recipient, the percentage of successful routings though such a multi-tiered menu structure can be quite low, in some cases, less than 40 percent. Stated differently, in such circumstances, more than 60 percent of the calls accessing such a multi-tiered menu structure might be either terminated without the caller having reached the desired objective or else defaulted to an operator (or other manned default station).

To address these limitations in the prior art, it would be desirable to provide a system which can understand and act upon verbal and non-verbal input from people. Traditionally, in such speech understanding systems, meaningful words, phrases and structures have been manually constructed, involving much labor and leading to fragile systems which are not robust in real environments. A major objective, therefore, would be a speech understanding system which is trainable, adaptive and robust—i.e., a system for automatically learning the language for its task.

SUMMARY OF INVENTION

The invention concerns an automated task classification system that operates on a task objective of a user. The system may include a meaningful phrase generator that generates a plurality of meaningful phrases from a set of verbal and non-verbal speech. Each of the meaningful phrases may be generated based on one of a predetermined set of the task objectives. A recognizer may recognize at least one of the generated meaningful phrases in an input communication of the user and a task classifier may make a classification decision in response to the recognized meaningful phrases relating to one of the set of predetermined task objectives.

BRIEF DESCRIPTION OF THE DRAWINGS

FIG. 1 provides illustrative examples of false and missed detection by a classifier for an automated call routing system based on use of "meaningful phrases".

FIG. 2 provides illustrative examples of correct detection by a classifier for an automated call routing system based on use of "meaningful phrases".

FIG. 3 depicts an illustrative example of the advantage provided by the "meaningful phrase" classification parameter of the system of the invention.

FIG. 6 provides illustrative examples of "meaningful phrases" determined according to the invention.

DETAILED DESCRIPTION OF THE PREFERRED EMBODIMENTS

Figure 4:
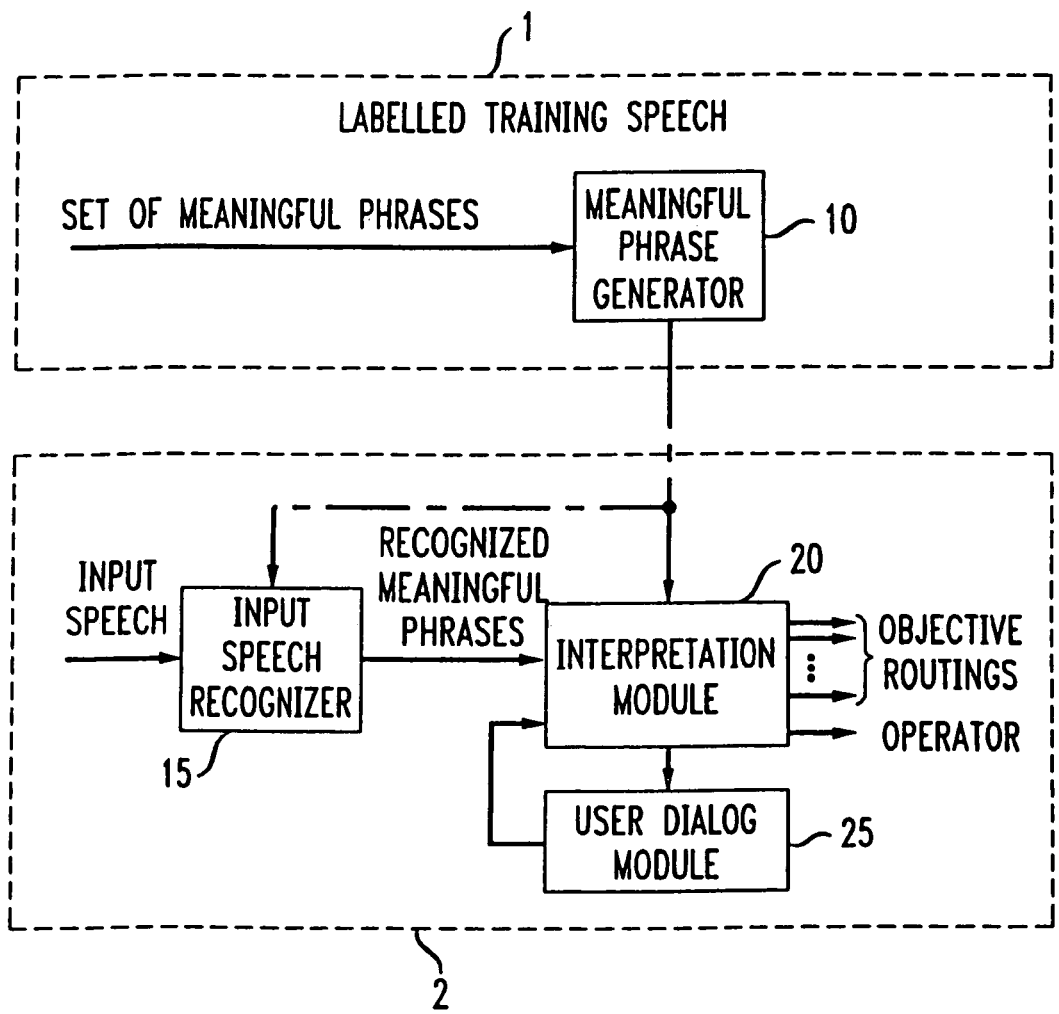
FIG. 4 presents in block diagram form the structure of the system of the invention.

The discussion following will be presented partly in terms of algorithms and symbolic representations of operations on data bits within a computer system. As will be understood, these algorithmic descriptions and representations are a means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with appropriate physical quantities B such terms being merely convenient labels applied to those quantities.

It is important as well that the distinction between the system's operations and operating a computer, and the system's computation itself should be kept in mind. The present invention relates to a system that operates a computer in processing electrical or other (e.g., mechanical, chemical physical signals to generate other desired physical signals.

For clarity of explanation, the illustrative embodiment of the present invention is presented as comprising individual functional blocks (including functional blocks labeled as "processors"). The function these blocks represent may be provided through the use of either shared or dedicated hardware, including, but not limited to hardware capable of executing software. For example the functions of processors presented in FIG. 4 may be provided by a single shared processor. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory a (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

A fundamental aspect of the invention is a task classification and routing service that shifts the burden of understanding a specialized vocabulary from the initiating party to the recipient. Thus, while the task classification system of the invention may be applied to other disciplines and technologies using linguistic and visual sensory inputs, for ease of discussion, a generalized embodiment of the invention is represented as a call routing system having the following characteristics:

First, a caller accessing the system will be presented with a greeting similar to "How may I help you?"

After a caller responds to that greeting with a natural speech statement of the caller's objective (such as a routing objective), the system is able to either classify the caller's request into one of a number of predefined objective routings and implement that routing, or to transfer the caller to an operator where the request did not fit one of the predefined objective routings or the system was unable to understand the caller's request.

To minimize erroneous routings, as well as transfers to an operator position when a caller actually wanted one of the predefined routing objectives, the system also incorporates a dialog function to obtain additional information from the caller for improving the system's confidence in a classification of a caller's objective.

Hereafter, an embodiment of the invention will be described based on access by a caller to a telephone service provider. In such an embodiment, routing objectives for a caller may include call billing options (e.g., collect, third-party), dialing information, billing questions, credit requests (as for a wrong or mis-dialed number), area codes, etc.

In traditional telephone switching systems, a user is often required to know separate numbers and/or dialing patterns to access different services provided by a telephone carrier, as well as possibly having to navigate a menu-driven system which then routes the user to the desired objective. In the system of the invention the user is able to access a central number and the user's objective will be implemented by the telephone carrier on the basis of its content.

An example of such content-based routing would be where a caller responds to a "How may I help you?" prompt with "I want to reverse the charges", whence the appropriate action is to connect the caller to an automated subsystem which processes collect calls. Another example would be a caller response of "I am having a problem understanding my bill", in which case the caller should be connected to the telephone carrier's business office. The system thus needs to understand spoken language to the extent of routing the call appropriately.

The system of the invention concerns the needs to understand language, both verbal and non-verbal, to the extent that a user's task objectives may be implemented. Earlier work describing the understanding of multi-sensory (or verbal and non-verbal) language is found in Gorin, A., "On automated language acquisition", J. Acoust. Soc. Am., 97 3441-3461, (June 1995) [hereafter referred to as Gorin 95], which is incorporated herein and made a part hereof. In this paper, the system described receives some input, comprising linguistic and possibly other stimuli, denoted as "language". In response to this input, it performs some action. See p. 3441.

The paper also discusses the construction of sensory primitive subnetworks, which learn cross-channel (i.e. multimodal) associations between different stimuli. Experiments discussed involve machines that receive both linguistic and visual input on respective channels, such as a focus of attention on a particular object. In this regard, a structure is described in the environment, in that input signals to the system can be organized into symbols and can be imposed on all sensory inputs. See page 3443.

Thus, in many situations of interest, the appropriate machine response depends not only on the spoken input but upon the state of the environment. In other words, the invention described below concerns devices with multisensory inputs (linguistic and visual) including verbal, non-verbal, and multimodal inputs. See p. 3450.

A number of considerations from that baseline approach are material to the system of the invention. Certain of those considerations will be briefly reviewed hereafter.

Central to the approach here is a database of a large number of utterances, each of which is related to one of a predetermined set of routing objectives. This database forms an input to a classification parameter algorithm. Preferably, such utterances will be extracted from actual user responses to a prompt of "How may I help you?" (or similar words to the same effect). Each utterance is then transcribed and labeled with one of the predetermined set of routing objectives. Illustrative utterances from the database utilized by the inventors are as follows:

Yeah, I want to reverse the charges
I was just disconnected from this number
I was trying to hang-up
I am trying reach Mexico
Charge this to my home phone In a related article co-authored by one of the inventors [Gorin, A. L., Hanek, H., Rose, R. and Miller, L., "Spoken Language Acquisition for Automated Call Routing", *in Proceedings of the International Conference on Spoken Language Processing (ICSLP 94)*, Yokohama (Sep. 18-22, 1994)] [hereafter Gorin 94A], it is noted that the distribution of routing objectives in such a database may be substantially skewed. The implications of such skewing may well be taken into account in the determination of the particular set of routing objectives to be supported on an automated basis by the system of the invention.

A salience principle as related to the system of the invention has been defined in another article co-authored by one of the inventors [Gorin, A. L., Levinson, S. E. and Sankar, A. "An Experiment in Spoken Language Acquisition," *IEEE Trans. on Speech and Audio, Vol.* 2, No. 1, Part II, pp. 224-240 (January 1994)] [hereafter Gorin 94]. Specifically, the salience of a word is defined as the information content of that word for the task under consideration. It can be interpreted as a measure of how meaningful that word is for the task. Salience can be distinguished from and compared to the traditional Shannon information content, which measures the uncertainty that a word will occur. As is known, such traditional information content can be estimated from examples of the language, while an estimation of salience requires both language and its extra-linguistic associations.

As previously noted, the baseline approach of Gorin 95 (which has been incorporated herein by reference) uses as a classification parameter words from test speech utterances which have a salient association with particular objective routings. A significant point of departure for the system's methodology of the invention from that baseline approach resides in the use of meaningful phrases as the classification parameter, a clear improvement over that baseline approach. Before describing the nature of that improvement, or the system's methodology for determining such meaningful phrases, it is useful to define two types of error experienced in such an automated call routing system and a related "success" concept:

False detection of a routing objective occurs when a salient (meaningful) phrase related to one routing objective is detected in a caller's input speech when the caller's actual request was directed to another routing objective. The probability of such a false detection occurring will hereafter be referred to by the designation: $P_{FD}$ Missed detection of a routing objective occurs when the callers input speech is directed to that routing objective and none of the meaningful phrases which are associated with that routing objective are detected in the input speech. The probability of such a missed detection occurring will hereafter be referred to by the designation: $P_{MD}$ Coverage for a routing objective refers to the number of successful translations by the system of a request for a routing objective to that routing objective relative to the total number of input requests for that routing objective. As an illustrative example, a routing objective for which 60 successful translations occurred out of 100 input requests for that routing objective would be said to experience 60% coverage. It is noted that Coverage=$1-P_{MD}$ Of the two error types defined above, one is significantly more "costly" than the other in an automated call router. The consequence of a false detection error is the routing of a caller to a different routing objective than was requested by the caller. Such a result is at least very annoying to the caller. The possibility also exists that such an error could result in a direct cost to the system provider—an annoyed customer or potential customer being classified here as an indirect cost—through some non-system error resulting from the caller being connected to an incorrect routing objective. The consequence of a missed detection error, on the other hand, is simply the routing of the caller to a default operator position and the only cost is the lost opportunity cost of not handling that particular call on an automated basis. Thus, while ideally the probabilities of both missed detection and false detection would be near zero, it is far more important that this objective be realized for false detection errors. As will be seen below, there are circumstances where tradeoffs must be made between minimizing one or another of these error probabilities, and this principle will be applied in such circumstances.

FIG. 1 provides several illustrative examples of False Detections and Missed Detections from the database of speech utterances used by the inventors. While the basis for error in each of these examples is believed to be largely self-explanatory, the error in the first example in each set will be briefly described. In the first example under False Detection, the meaningful phrase is I NEED CREDIT, and thus this phrase would have been classified as a request for credit. However, from reading the entire utterance, it is apparent that the caller actually wanted to be transferred to another carrier (the carrier receiving this request being AT&T). In the first example under Missed Detections, there are no meaningful phrases identified in the utterance (and therefore no basis for classifying the caller's objective), although it is apparent from reading the utterance that the caller is seeking a billing credit. As a comparative illustration, FIG. 2 shows several examples of correct detection of a billing credit objective from meaningful phrases in the input speech.

There are two significant advantages of the system's methodology of the invention in using meaningful phrases as the classification parameter over the use of salient words in the baseline approach described in Gorin 95. First, with the use of words as the classification parameter, the word choices for detecting a given routing objective may be highly limited in order to achieve a minimum probability of false detection—i.e. use of only words having a near likelihood of predicting the intended routing objective—and therefore the coverage for such a routing objective is likely to be very low, leading to a high probability of missed detection errors occurring. With meaningful phrases as a classification parameter, on the other hand, both low probability of false detection and low probability of missed detection are achievable.

FIG. 3 provides an illustrative example of this advantage. That figure shows the Classification Rate and the Coverage for an exemplary routing objective, Billing Credit, as the phrase used for the classification parameter grows in length and/or complexity. The Classification Rate is defined as the probability of the routing objective (CREDIT) having been requested, given the occurrence of the selected phrase in the input speech (i.e., P(CREDIT I phrase). Similarly, the Coverage term is defined as the probability of the selected phrase appearing in the input speech, given that the designated routing objective (CREDIT) has been requested. In the Phrase column, parenthesis surrounding a series of terms separated by "I" indicate one of those terms appearing in the indicated position with other terms in that row. The nomenclature "F(Wrong)" indicates a grammar fragment surrounding the word "wrong", the phrase in the fourth row of that column being representative of such a grammar fragment surrounding a salient word. The designation "previous" indicates a carry forward of everything on the preceding line. And finally, the abbreviation "eos" indicates "end of sentence".

The second area of improvement relates to the speech recognition function which operates on the caller's input speech. Essentially, at the present state of the art of speech recognition systems, the larger the fragment of speech presented to such a speech recognizer, the higher the probability of a correct recognition of that speech fragment. Thus, a speech recognizer programmed to spot one of a set of salient words can be expected to fail in its task significantly more often than such a device programmed to spot meaningful phrases, comprising two or more words.

FIG. 4 shows in block diagram form an exemplary structure that may perform the inventive system's method. As can be seen from the figure, that structure comprises two related subsystems: Meaningful phrase generation subsystem 1 and Input speech classification subsystem 2. As already described, Meaningful phrase generation subsystem 1 operates on a database of a large number of utterances each of which is related to one of a predetermined set of routing objectives, where each such utterance is labeled with its associated routing objective. The operation of this subsystem is essentially carried out by Meaningful phrase processor 10 which produces as an output a set of meaningful phrases having a probabalistic relationship with one or more of the set of predetermined routing objectives with which the input speech utterances are associated. The operation of Meaningful phrase processor 10 is generally determined in accordance with a grammatical inference algorithm, described below.

Operation of Input speech classification subsystem 2 begins with the inputting of a caller's routing objective request, in the caller's natural speech, to Input Speech Recognizer 15. That Input Speech Recognizer may be of any known design and performs the function of detecting, or spotting, the existence of one or more meaningful phrases in the input speech. As can be seen in the figure, the meaningful phrases developed by Meaningful phrase generation subsystem 1 are provided as an input to Speech Recognizer 15.

The output of Speech Recognizer 15, which will comprise the recognized meaningful phrase(s) appearing in the caller's routing objective request, is provided to Interpretation Module 20. That Interpretation Module applies a confidence function, based on the probabalistic relation between the recognized meaningful phrase(s) and selected routing objectives, and makes a decision either to implement the chosen routing objective (in the case of high confidence) with an announcement to the caller that such an objective is being implemented, or to seek additional information and/or confirmation from the caller via User Dialog Module 25, in the case of lower confidence levels. Based on caller feedback in response to such an inquiry generated by Interpretation Module 20, the Interpretation Module again applies the confidence function to determine if a decision to implement a particular routing objective is appropriate. This feedback process continues until either a decision can be made to implement a particular routing objective or a determination is made that no-such decision is likely, in which case the caller is defaulted to an operator position.

As will thus be apparent, the meaningful phrases developed by Meaningful phrase generation subsystem 1 are used by Input Speech Recognizer 15, to define the phrases which the Recognizer is programmed to spot, and by Interpretation Module 20, both to define the routing objectives related to meaningful phrases input from Speech Recognizer 15 and to establish the level of confidence for a relation of such input meaningful phrase(s) to a particular routing objective.

Figure 5:
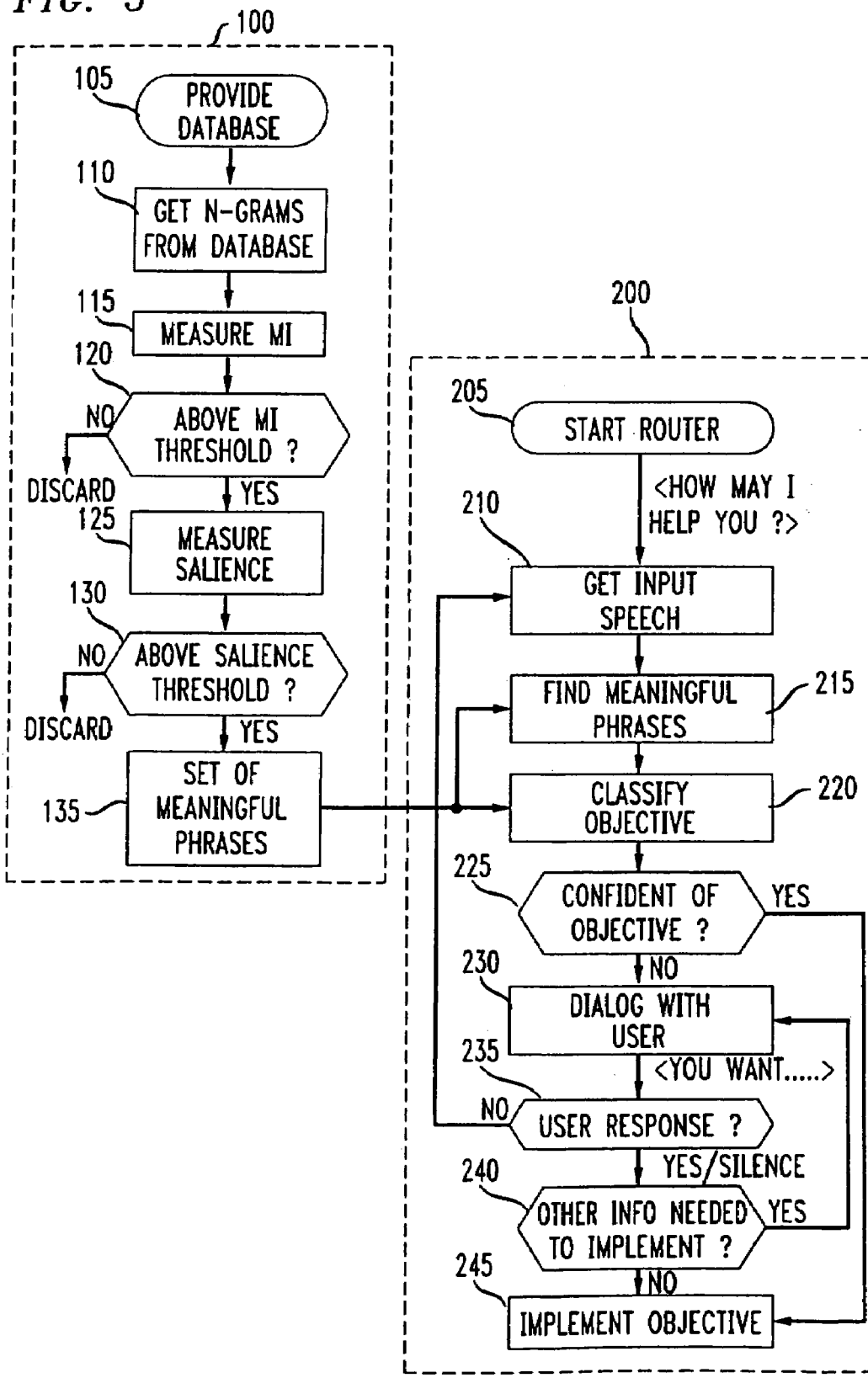
FIG. 5 depicts the methodology used by the system of the invention in flowchart form.

The system's methodology of the invention is graphically illustrated in the flowchart of FIG. 5. It will be appreciated from prior discussion that the process depicted in FIG. 5 is broadly separated between Meaningful Phrase Generation functions 100 and Automated Call Routing functions 200. Considering first the Meaningful Phrase Generation functions, a database of speech utterances labeled with a requested objective is provided at step 105, and that database is accessed at step 110 to extract a set of n-grams. The mutual information of those n-grams is determined at step 115 and the MI values so determined are compared with a predetermined threshold at step 120. n-grams having an Ml value below the threshold are discarded and those above the threshold are operated on by salience measuring step 125. In step 130 those salience values are compared with a predetermined salience threshold and those n-grams having a salience value below the threshold are discarded. n-grams passing the salience threshold test are stored at step 135 as the set of meaningful phrases.

The Automated Call Routing functions begin with step 205 where a caller accessing the router is provided a greeting similar to "How may I help you?" The caller's response to that greeting is obtained at step 210 and that response is examined for the presence of one or more meaningful phrases. As can be seen in the figure, the set of meaningful phrases will have been provided as an input to step 215 as well as step 220. In step 220, an attempt is made to classify the caller's objective based on meaningful phrase(s) found in the caller's input speech. A confidence factor is invoked at step 225, and a decision is made as to whether a sufficient confidence level exist to implement the classified objective. If yes, the objective is implemented, at step 245. If the confidence function dictates either that an affirmation from the user or more information is needed, a dialog with the user is carried out at step 230. Such dialog will typically begin with a query to the user of the form "You want . . . ?" If the user responds in the negative to such a query, at step 235, the process returns to step 210 with a restatement by the user of its request. A "yes" or silence response from the user moves the process along to step 240, where consideration is given to whether other information is needed to carry out the objective which was not in the input speech—e.g., the number to be credited in the case of a credit request. Where additional information is needed, the process returns to step 230 for additional dialog with the user. If no additional information is required, the objective is implemented at step 245.

As will be understood at this point, a fundamental focus of this invention is that of providing a system which learns to understand and act upon spoken input. It will be apparent that the ultimate goal of such a speech understanding system will be to extract meaning from the speech signal. Moreover, as was shown in Gorin 95, for systems which understand linguistic and visual language, the semantic aspects of communications are highly significant. Not surprisingly, such semantic considerations are fundamental to the development of the meaningful phrases used as classification parameters in the system of the invention.

The determination of the meaningful phrases used by the invention is founded in the concept of combining a measure of commonality of words and/or structure within the language—i.e., how often groupings of things co-occur—with a measure of significance to a defined task for such a grouping. In the preferred embodiment of the invention, that commonality measure within the language is manifested as the mutual information in n-grams derived from a database of training speech utterances and the measure of usefulness to a task is manifested as a salience measure. Other manifestations of these general concepts will be apparent to those skilled in the art.

As is known, mutual information ("MI"), which measures the likelihood of co-occurrence for two or more words, involves only the language itself. For example, given War and Peace in the original Russian, one could compute the mutual information for all the possible pairings of words in that text without ever understanding a word of the language in which it is written. In contrast, computing salience involves both the language and its extra-linguistic associations to a device's environment. Through the use of such a combination of Ml and a salience factor, phrases may be selected which have both a positive Ml (indicating relative strong association among the words comprising the phrase) and a high salience value.

The meaningful phrase determination is implemented in a Grammatical Inference ("GI") algorithm. That GI algorithm searches the set of phrases which occur in the training database using as a selection criteria both the mutual information (within the language) of a phrase and a measure of the salience of the phrase for a task under consideration. In its general form the GI algorithm carries out the following steps.

1. n=number of words in a phrase to be evaluated.
2. Set n=1.
3. Generate a list of phrases on length n in training database.
4. Evaluate commonality of those phrases (as function of frequency/probability) and salience of the phrases.
5. Select subset according to a predetermined threshold.
6. Generate list of phrases of length n+1 by expanding the set of phrases on length n.
7. Evaluate mutual information and salience for the phrases generated
   in step 6.

8. Select subset according to a predetermined threshold.
9. Set n=n+1
10. Go to step 6.

The algorithm may be carried out to any level of n desired and the selection threshold may be varied up or down with successive iterations to vary the output of the algorithm. That output will be a set of meaningful phrases.

An exemplary output of this algorithm is shown in FIG. 7. In that figure, the exemplary meaningful phrases are shown along with the MI value, the salience value, and the Action to which the meaningful phrase is directed at the probability value shown. Note that the Max Probability (sometimes designated $P_{max}$ is used as a proxy for the salience value. That Max Probability is defined as the maximum of the distribution of probabilities of each action, given the phrase under consideration, which probabilities are determined by a sub-step of the GI algorithm.

As an aid to further understanding of the invention, two illustrative dialogues from the operation of the system of the invention are hereafter presented. In Session One, the system immediately understands the input, based on learned associations between the content of the sentence and the selected routing objective of third-number billing.

Hello, how may I help you?
 "I want to charge this call to my home phone."

You want to bill this call to a third party.

Please enter the billing number:
 As can be seen, the absence of a response from the caller during the pause between the second and third inquiries from the system was interpreted as assent to the second inquiry.

In Session Two, the system encounters an ambiguous input, which is resolved via dialog. Note the hesitant response, based on the system's confidence model. Observe also that the second input involves both negative reinforcement (no) and additional clarifying information.

Hello, how may I help you?
 "Can I charge this call please?"

Do you want to bill this call to a third party?
 "No, I want to put this on my Universal card."

You want to bill this call to a credit card.

Please enter the card number:
 A novel automated call routing system has been disclosed which carries out the function of searching for a classification parameter in natural speech, that classification parameter being manifested as a set of meaningful phrases, which are themselves defined in terms of mutual information and a salience factor. Then, depending on whether one or more particular meaningful phrases are found in the input speech, a decision rule is applied to classify the appropriate routing objective. An important advantage of the system of the invention is that the vocabulary and grammar for the system are unconstrained, being acquired by the system during the course of performing its task. By contrast, in prior art systems, the salient vocabulary words and their meanings are explicitly provided to the system.

While prior art language recognition systems have been very much handcrafted and lacking in robustness, the system of the invention brings an automated training procedure to the language recognition function—automated procedures for determining meaningful phrases in test speech utterances marked with associated objective routings B and then finds such meaningful phrases in caller input speech (possibly including confidence enhancing dialog with the caller) and implements the caller-requested objective routing.

Although the present embodiment of the invention has been described in detail, it should be understood that various changes, alterations and substitutions can be made therein without departing from the spirit and scope of the invention as defined by the appended claims.

What is claimed is:

1. An automated task classification system that operates on a task objective of a user, through a natural language dialog with the user in which system prompts are not ordered in a menu, the system comprising:

a recognizer that spots at least one of a plurality of meaningful phrases in substantially simultaneous user natural language verbal and non-verbal input, wherein the natural language verbal and non-verbal input each convey different information and are associated with a coordinated message that achieves an appropriate response, each of the plurality of meaningful phrases having an association with at least one of a predetermined set of task objectives, and the predetermined set of task objectives based, at least partly, on a salience measure of one of the plurality of meaningful phrases to a specified one of the predetermined task objectives, wherein the salience measure is represented as a conditional probability of the task objective being requested given an appearance of one of the plurality of meaningful phrases in the input communication, the conditional probability being a highest value in a distribution of conditional probabilities over the set of predetermined task objectives; and a task classifier that makes a classification decision based, at least partly, on the spotted at least one of the plurality of meaningful phrases.

2. The automated task classification system of claim 1, wherein the meaningful phrases are expressed in a multimodal form.

3. The automated task classification system of claim 2, wherein the multimodal form includes inputs from at least one channel.

4. The automated task classification system of claim 1, wherein the meaningful phrases in the user's input communication received by the recognizer are derived from the user's actions.

5. The automated task classification system of claim 1, further comprising a dialog module that enters into a dialog with the user to obtain a feedback response from the user.

6. The automated task classification system of claim 5, wherein the dialog module prompts the user to provide a feedback response that includes additional information with respect to the user's initial input communication.

7. The automated task classification system of claim 5, wherein the dialog module prompts the user to provide a feedback response that includes confirmation with respect to at least one of the set of task objectives determined in the classification decision.

8. The automated task classification system of claim 1, wherein the task classifier routes the input communication based on the classification decision.

9. The automated task classification system of claim 8, wherein the task objective is performed after the input communication is routed by the task classifier.

10. The automated task classification system of claim 1, wherein the system is used for customer care purposes.

11. The automated task classification system of claim 1, wherein the classification decision and the corresponding input communication of the user are collected by the system for automated learning purposes.

12. The automated task classification system of claim 1, wherein each of the plurality of meaningful phrases has a salience measure exceeding a predetermined threshold.

13. The automated task classification system of claim 1, wherein the association between the meaningful phrases and the predetermined set of task objectives is based, at last partly, on a measure of commonality within a language of the meaningful phrases.

14. The automated task classification system of claim 13, wherein the measure of commonality is a mutual information measure.

15. The automated task classification system of claim 14, wherein each of the plurality of meaningful phrases has a mutual information measure exceeding a predetermined threshold.

16. The automated task classification system of claim 1, wherein the task classifier makes the classification decision using a confidence function.

17. The automated task classification system of claim 1, wherein the input communication from the user represents a request for at least one of the set of predetermined task objectives.

18. The automated task classification system of claim 1, wherein the input communication is responsive to a query of a form "How may I help you?".

19. The automated task classification system of claim 1, wherein each of the natural language verbal input and the non-verbal input are directed to one of the set of predetermined task objectives and each of the natural language verbal input and the non-verbal input is labeled with the one task objective to which it is directed.

20. An automated routing system that automatically routes a user's request based on an automated task classification decision, through a natural language dialog with the user in which system prompts are not ordered in a menu, the system comprising:
  a recognizer that spots at least one of the plurality of meaningful phrases in substantially simultaneous user natural language verbal and non-verbal input, wherein the natural language verbal and non-verbal input each convey different information and are associated with a coordinated message that achieves an appropriate response, each of the plurality of meaningful phrases having an association with at least one of a predetermined set of task objectives, and the predetermined set of task objectives based, at least partly, on a salience measure of one of the plurality of meaningful phrases to a specified one of the predetermined task objectives, wherein the salience measure is represented as a conditional probability of the task objective being requested given an appearance of one of the plurality of meaningful phrases in the input communication, the conditional probability being a highest value in a distribution of conditional probabilities over the set of predetermined task objectives;
  a task classifier that makes a classification decision based, at least partly, on the spotted at least one of the plurality of meaningful phrases; and
  a task router that routes the user's request in order to perform at least one of the task objectives based on the classification decision.

21. The automated routing system of claim 20, wherein the meaningful phrases are expressed in multimodal form.

22. The automated routing system of claim 21, wherein the multimodal form includes inputs from at least one channel.

23. The automated routing system of claim 20, wherein the meaningful phrases in the user's input communication received by the recognizer are derived from the user's actions.

24. The automated routing system of claim 20, further comprising a dialog module that enters into a dialog with the user to obtain a feedback response from the user.

25. The automated routing system of claim 24, wherein the dialog module prompts the user to provide a feedback response that includes additional information with respect to the user's request.

26. The automated routing system of clam 24, wherein the dialog module prompts the user to provide a feedback response that includes confirmation with respect to at least one of the set of task objectives determined in the classification decision.

27. The automated routing system of claim 24, wherein if the task classifier cannot make a classification decision after the dialog is conducted with the user, the router routes the user's request to a human for assistance.

28. The automated routing system of claim 27, wherein the task objective is performed after the user's request is routed.

29. The automated routing system of claim 20, wherein the system is used for customer care purposes.

30. The automated routing system of claim 20, wherein the classification decision and the corresponding user request are collected by the system for automated learning purposes.

31. The automated routing system of claim 20, wherein each of the plurality of meaningful phrases has a salience measure exceeding a predetermined threshold.

32. The automated routing system of claim 20, wherein the association between the plurality of meaningful phrases and the predetermined set of task objectives is based, at least partly, on a measure of commonality with a language of the plurality of meaningful phrases.

33. The automated routing system of claim 32, wherein the measure of commonality is a mutual information measure.

34. The automated routing system of claim 33, wherein each of the plurality of meaningful phrases has a mutual information measure exceeding a predetermined threshold.

35. The automated routing system of claim 20, wherein the task classifier makes the classification decision using a confidence function.

36. The automated routing system of claim 20, wherein the user's request represents a request for at least one of the set of predetermined task objectives.

37. The automated routing system of claim 20, wherein the user's request is responsive to a query of a form "How may I help you?".

38. The automated routing system of claim 20, wherein each of the natural language verbal input and the non-verbal input are directed to one of the set of predetermined task objectives and each of the natural language verbal input and the non-verbal input being labeled with the one task objective to which it is directed.

39. The automated task classification system of claim 1, through a natural language dialog with the user in which system prompts are not ordered in a menu, the system further comprising:
  an interpretation module configured to apply a confidence function based on a probabilistic relation between the spotted at least one of the plurality of meaningful phrases in the input communication of the user and the at least one of the predetermined set of task objectives, wherein
  the task classifier makes the classification decision based, at least partly on, a result of the applied confidence function.

40. The automated routing system of claim 20, further comprising
an interpretation module configured to apply a confidence function based on a probabilistic relation between the spotted at least one of the plurality of meaningful phrases in the user's request and the at least one of the predetermined set of task objectives, wherein the task classifier makes the classification decision based, at least partly, on a result of the applied confidence function.

* * * * *